(12) United States Patent
Kumkar et al.

(10) Patent No.: US 8,724,863 B2
(45) Date of Patent: *May 13, 2014

(54) OPTICAL FIBER HAVING CLADDING SCATTERING CENTERS

(75) Inventors: Malte Kumkar, Weimar (DE); Rudolf Huber, Aldingen (DE)

(73) Assignee: Trumpf Laser GmbH + Co. KG, Schramberg (DE)

( * ) Notice: Subject to any disclaimer, the term of this patent is extended or adjusted under 35 U.S.C. 154(b) by 208 days.

This patent is subject to a terminal disclaimer.

(21) Appl. No.: 13/035,412

(22) Filed: Feb. 25, 2011

(65) Prior Publication Data

US 2011/0194816 A1    Aug. 11, 2011

Related U.S. Application Data

(63) Continuation of application No. 12/088,773, filed as application No. PCT/CT2006/009439 on Sep. 28, 2006, now Pat. No. 7,916,991.

(30) Foreign Application Priority Data

Sep. 29, 2005 (EP) .................................... 05021245

(51) Int. Cl.
G02B 6/02    (2006.01)
(52) U.S. Cl.
USPC ........................................... 382/127; 65/376
(58) Field of Classification Search
None
See application file for complete search history.

(56) References Cited

U.S. PATENT DOCUMENTS

| 4,637,686 A | 1/1987 | Iwamoto |
| 6,625,363 B2 | 9/2003 | Carter et al. |
| 7,916,991 B2 * | 3/2011 | Kumkar et al. ............... 385/127 |
| 2004/0071420 A1 | 4/2004 | Sezerman et al. |
| 2005/0117860 A1 | 6/2005 | Vienne et al. |

FOREIGN PATENT DOCUMENTS

| EP | 1033795 A2 | 9/2000 |
| EP | 1213594 | 6/2002 |
| JP | 59187301 A | 10/1984 |
| JP | 2000252559 A | 9/2000 |
| JP | 2004252057 A | 9/2004 |

OTHER PUBLICATIONS

The International Search Report and Written Opinion for corresponding PCT Application No. PCT/EP2006/009439, mailed Dec. 19, 2006, 11 pages.

(Continued)

*Primary Examiner* — Sarah Hahm
(74) *Attorney, Agent, or Firm* — Fish & Richardson P.C.

(57) ABSTRACT

An optical fiber is designed to transmit high-power laser radiation. The optical fiber includes a fiber core, and an inner fiber cladding surrounding the fiber core, where the inner fiber cladding is configured to carry the laser radiation in the fiber core. The optical fiber also includes a first outer fiber cladding surrounding the inner fiber cladding. The first outer fiber cladding has a capillary-free longitudinal section and has a smaller refractive index than the refractive index of the inner fiber cladding. The optical fiber includes an outermost fiber cladding surrounding the first outer fiber cladding. The outermost fiber cladding has scattering centers that surround the capillary-free longitudinal section, where the scattering centers scatter laser radiation emerging from the inner fiber cladding through the first outer fiber cladding along the capillary-free section.

16 Claims, 2 Drawing Sheets

(56) References Cited

OTHER PUBLICATIONS

Notification of Transmittal of Translation of the International Preliminary Report on Patentability for corresponding PCT Application No. PCT/EP2006/009439, mailed May 8, 2008, 7 pages.

Office Action from corresponding Chinese Application No. 200680044841.6, mailed Jul. 24, 2009, 10 pages, with English translation.

Furusawa et al, "A cladding pumped Ytterbium-doped fiber laser with holey inner and outer cladding", Optics Express, pp. 714-720, 2001.

\* cited by examiner

OPTICAL FIBER HAVING CLADDING SCATTERING CENTERS

CROSS REFERENCE TO RELATED APPLICATIONS

This application is a continuation of U.S. Ser. No. 12/088,773, filed Dec. 19, 2008, which is the National Stage of International Application No. PCT/EP2006/009439 filed on Sep. 28, 2006, which claims the benefit of European Patent Application No. 05021245.5, filed on Sep. 29, 2005, all of which are incorporated herein by reference in their entirety.

TECHNICAL FIELD

The invention relates to an optical fiber for the transmission of high-power laser radiation. The optical fiber includes a fiber core, an inner fiber cladding surrounding the fiber core for guiding the laser radiation in the fiber core, a first outer fiber cladding surrounding the inner fiber cladding, which has a smaller refractive index than the inner fiber cladding as a result of longitudinally aligned gas-filled capillaries, and a second outer fiber cladding surrounding the first outer fiber cladding. The first outer fiber cladding has a capillary-free longitudinal section. The invention also relates to a method for producing such an optical fiber.

BACKGROUND

An optical fiber has become known, for example, from U.S. Publication No. 2005/0117860 A.

Optical fibers are used in conjunction with high-power lasers as optical waveguides, in order to carry the laser radiation from the laser over a path to an application, e.g., to a material processing device. Optical waveguides (such as optical fibers) for the transmission of laser radiation in the kilowatt-power region usually consist of a quartz glass core (optical fiber core) and a quartz glass cladding (optical fiber cladding), which due to suitable doping or microstructuring has a lower (effective) refractive index than the optical fiber core. The core carries laser radiation up to a maximum acceptance angle by means of total internal reflection. The cladding is not used for light transmission, but provides the lower refractive index necessary for the total internal reflection. To protect the optical fiber, a protective sheath made of a flexible material (e.g., silicon or acrylate) is applied to the quartz glass cladding. The protective sheath, in general, has a lower refractive index than the quartz glass cladding and partially absorbs the laser radiation.

Optical fibers with a microstructured quartz glass cladding, which are also referred to as "photonic crystal fibers", have a quartz glass cladding, which contains longitudinal, air-filled capillaries, in order to reduce the effective refractive index of the quartz glass cladding. The capillaries extend parallel to the fiber core. The spacing and diameters of the capillaries determine the numerical aperture of the fiber core: the larger the diameter of the capillaries and the closer together they are arranged, the higher is the numerical aperture of the fiber core. The numerical aperture of the fiber core influences the beam quality of the transmitted radiation. A recent design for optical fibers for the transmission of laser radiation of high (peak-pulse) power is offered by hollow fibers, which instead of a solid quartz glass core have a hollow, air-filled core. In these hollow fibers the core is also surrounded by a capillary-threaded quartz glass cladding.

To couple into the optical waveguide fiber, a laser beam is focused for example, on the input end of the fiber. When using this method, part of the laser radiation can also enter the cladding region of the fiber. This occurs, in particular, during the necessary mutual adjustment of laser beam and optical fiber. Equally, radiation power can enter the cladding region due to backscattering and reflection from the workpiece being processed. This proportion of the laser radiation entering the fiber cladding can also be conveyed by total reflection outside the fiber core, if the optical fiber is surrounded by a flexible protective sheath that has a lower refractive index than that of the cladding region. If, e.g. at fiber bends or spliced connections, the total reflection of the cladding region is disturbed, then laser radiation can escape from the quartz glass cladding into the protective sheath, or pass through it. Due to radiation absorption in the protective sheath, this can be heated and destroyed. The radiation not carried in the fiber core can lead to damage to the end regions of the fiber, in particular. Furthermore, the beam quality of the transmitted laser radiation is worsened, which can adversely affect following optical components and the processing quality.

In the optical fiber known from the above mentioned U.S. Publication No. 2005/0117860 A, the capillary-free longitudinal section forms a side window, in order to couple light into the inner fiber cladding or out of the inner fiber cladding. The capillary-free longitudinal section can be produced by lengthening the optical fiber, causing the capillaries to collapse in that area and at the same time causing the fiber core to become tapered. In the tapered fiber core section, higher-order modes propagating in the fiber core are eliminated, that is, the tapered fiber core section acts as a mode filter, where the eliminated higher-order modes propagate in the inner fiber cladding.

From U.S. Pat. No. 4,637,686, an optical fiber is known with an outer fiber cladding surrounding the inner fiber cladding, which over its entire length has substances for the dispersal or absorption of light propagating in the fiber cladding. The outer fiber cladding has a higher refractive index than the inner fiber cladding, so that light in the inner fiber cladding is not guided by total reflection and enters the outer fiber cladding, where after only a short distance it is dispersed or absorbed by the substances.

From U.S. Publication No. 2004/0071420 A, a further optical fiber is known, which has one or more zones with constantly varying refractive index, so that light propagating in the fiber core can escape into the fiber cladding.

Finally, EP 1 213 594 A discloses another optical fiber, the fiber cladding of which has scattering elements.

SUMMARY

By contrast, it is the object of the present invention to reduce, as simply as possibly, negative effects caused by laser radiation entering the cladding region in an optical fiber of the above mentioned type, without affecting the radiation-guiding characteristics of the fiber core.

The object is achieved according to the invention in that the second outer fiber cladding has scattering centers, at least in the region of the capillary-free longitudinal section, for scattering the laser radiation emerging from the inner fiber cladding along the capillary-free longitudinal section. The capillary-free longitudinal section can extend annularly over the entire circumference, or can extend only over part of the circumference of the optical fiber.

In such an optical waveguide fiber according to the invention, radiation coupled into the inner fiber cladding is reliably carried until it impinges on the capillary-free longitudinal section. There, the radiation carried in the inner fiber cladding passes into the second outer fiber cladding, undergoes a change of angle at the scattering centers and is thus deliberately extracted from the fiber. The radiation-guiding characteristics of the fiber core along the capillary-free longitudinal section remain largely unaffected.

The fiber core can consist of doped or undoped quartz glass, or be formed by the gas-filled, for example, air-filled, cavity of a hollow fiber.

In an embodiment, the inner fiber cladding consists of doped quartz glass, the doping of which is chosen in such a way that the inner fiber cladding has a smaller refractive index than the fiber core. A suitable doping for reducing the refractive index of the inner fiber cladding, in the case of quartz glass, for example, consists of fluoride ions.

In another embodiment, the inner fiber cladding has a smaller refractive index than the fiber core, as a result of longitudinally aligned gas-filled, for example, air-filled, capillaries. The capillaries arranged in the first outer fiber cladding have a larger diameter than the capillaries of the inner fiber cladding and are arranged closely adjacent to one another, in such a way that a similar value to that of air results for the refractive index of the first outer fiber cladding. In this way, laser radiation, which has been coupled into the inner fiber cladding, is guided within the inner fiber cladding by total reflection and can be selectively coupled out at specific points.

In some embodiments, the first and second outer fiber claddings consist of quartz glass.

The second outer fiber cladding can have scattering centers over its entire length. Alternatively, the scattering centers can also extend only over limited sections of the length of the optical fiber, i.e., they can be introduced into the outer fiber cladding selectively as extraction points. The scattering centers can be air-filled bubbles or micro-crystals, and can be introduced into the second outer fiber cladding by means of an appropriately structured preform (quartz glass with bubbles or micro-crystals), or by irradiation of the fiber using ultra-short laser pulses. To generate gas bubbles over the entire length of the second outer fiber cladding, the optical-fiber preform has an outermost layer made of opaque quartz, i.e., quartz containing air bubbles. To generate microcrystallites in the second outer fiber cladding during the production of the synthetic quartz glass for the fiber preform, the process can be controlled in such a way that microcrystallites are formed. When drawing the optical fiber these micro-crystals remain as scattering centers. Alternatively, nano-particles can be introduced in the region of the preform, which after the drawing process, forms the second outer fiber cladding.

In some embodiments, the scattering centers are only provided in an inner space of the second outer fiber cladding far from the surface, so that the boundary surface adjacent to the first outer cladding and the surface of the second outer cladding have no flaws. The mechanical strength of the optical fiber is thus affected as little as possible. To generate scattering centers selectively in specific length sections of the already drawn fiber, the fiber is irradiated with an ultra-short pulsed laser. The wavelength of the laser beam is chosen such that the fiber material is largely transparent to the laser beam up to a specific power density of the beam. If this power density is reached in the focus of the laser beam, then due to microscopic damage to the quartz material, a scattering center is formed. The laser beam is directed onto the optical fiber in such a way that the focal point of the laser beam lies in the second outer fiber cladding.

If the optical fiber is surrounded by a protective sheath that does not have an adequate performance capability, then this can be removed along the capillary-free longitudinal section. The second outer fiber cladding is then surrounded by an absorber along the capillary-free longitudinal section. It is moreover possible to arrange a power measurement sensor on the capillary-free longitudinal section, in order to therefore measure the radiation power carried in the inner fiber cladding. This is advantageous, for example, during the mutual adjustment of laser beam and optical fiber.

The invention also relates to a method for producing a high-performance optical fiber constructed as above, where an optical fiber with a fiber core, an inner fiber cladding surrounding the fiber core, a first outer fiber cladding surrounding the inner fiber cladding, and a second outer fiber cladding surrounding the first outer fiber cladding. The first outer fiber cladding has a smaller refractive index than the inner fiber cladding as a result of longitudinally aligned gas-filled capillaries within the first outer fiber cladding. The second outer fiber cladding has scattering centers on a longitudinal section or over its entire length. The optical fiber is heated on a longitudinal section and the capillaries of the first outer fiber cladding present in this longitudinal section are thereby removed. In other words, the capillary structure of the first outer fiber cladding is collapsed on the desired longitudinal sections by heating, without substantially affecting the structures of the remaining fiber layers. The heating of the optical fiber takes place, for example, in a gas flame, by heat radiation from a resistance-heated element, or with the aid of a laser. If the capillary structure of the first outer fiber cladding collapses, then at this point the total reflection of the radiation carried in the inner fiber cladding is removed, and the radiation is coupled over into the second outer fiber cladding. There it is scattered out of the optical fiber at the scattering centers. The collapsing of the capillary structure of the first outer fiber cladding takes place over the entire circumference of the optical fiber.

The invention also relates to the use of an optical fiber constructed as above for the transmission of high-power laser radiation. This involves the laser radiation reaching the inner fiber cladding being carried reliably in the inner fiber cladding as far as the region of the capillary-free longitudinal section. There the laser radiation passes out of the inner fiber cladding into the second outer fiber cladding, is scattered at the scattering centers out of the optical fiber and captured in an absorber surrounding the optical fiber.

The inventive optical fiber cannot only be used as an optical waveguide for the transmission of laser radiation from the laser to a processing site, but can also be deployed directly inside a laser resonator or a laser amplifier. There it acts as a loss element for higher laser modes, which are selectively coupled out at the capillary-free longitudinal sections of the fiber.

Further advantages and advantageous configurations of the subject matter of the invention can be found in the description, the drawing and the claims. The above cited and the additional features listed can each be used equally well alone or in groups in arbitrary combinations. The embodiments shown and described are not to be understood as an exhaustive list, but rather have an exemplary character for describing the invention.

DETAILED DESCRIPTION

Figure 1:
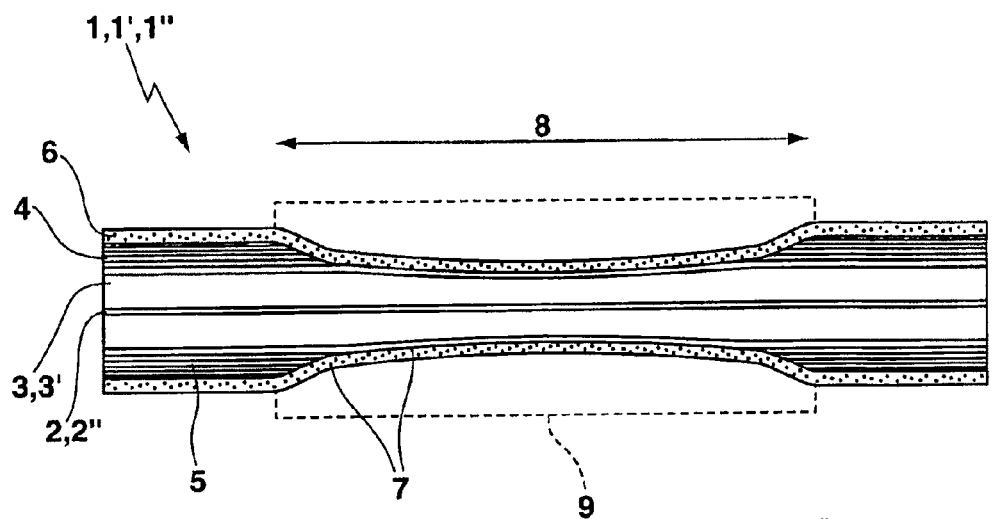
FIG. 1 is a drawing of an optical fiber in the region of a capillary-free length in longitudinal section.
Figure 2:
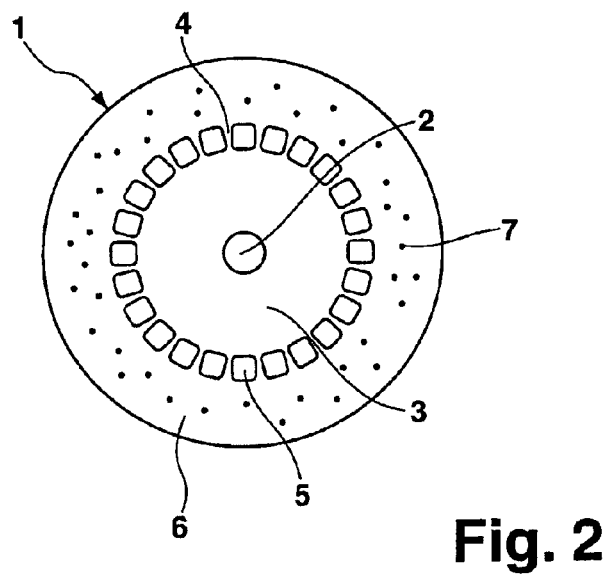
FIGS. 2-4 are cross-sectional views of different embodiments of the optical fiber shown in FIG. 1.

The optical fiber 1 shown in FIG. 1 and FIG. 2 is used for the transmission of laser radiation at high power (>500 W).

The fiber 1 includes a fiber core 2 made of undoped or doped quartz glass, an inner fiber cladding 3 surrounding the fiber core 2, a first outer fiber cladding 4 made of quartz glass surrounding the inner fiber cladding 3, and a second outer fiber cladding 6 made of quartz glass surrounding the first outer fiber cladding 4. The inner fiber cladding 3 is made of doped, for example, fluorine-doped quartz glass of smaller refractive index than the fiber core 2. The first outer fiber cladding 4 has a smaller refractive index than the inner fiber cladding 3 as a result of longitudinally aligned air-filled capillaries 5 within the first outer fiber cladding 4. The second outer fiber cladding 6 has scattering centers 7 over its entire length. The first outer fiber cladding 4 has a thinner, capillary-free longitudinal section 8, on which the second outer fiber cladding 6 is surrounded by an absorber 9. The scattering centers scatter the laser radiation emerging from the inner fiber cladding 3 along the capillary-free longitudinal section 8.

The fiber core 2 carries laser radiation up to a maximum acceptance angle by means of total internal reflection. The inner fiber cladding 3 is not used for transmitting light, but provides the lower refractive index necessary for the total internal reflection, which is adjusted appropriately by adjusting the doping. Laser radiation can nevertheless the inner fiber cladding 3, e.g. when coupling the laser radiation into the fiber core 2. The laser radiation that enters the inner fiber cladding 3 is carried therein by means of total reflection, as the first outer fiber cladding 4 has a lower refractive index than the inner fiber cladding 3 as a result of its longitudinally aligned air-filled capillaries 5. The capillaries 5 extend parallel to the fiber core 2. On the capillary-free longitudinal section 8 this total reflection is removed for the laser radiation carried in the inner fiber cladding 3, and the laser radiation therefore emerges along the capillary-free longitudinal section 8 into the second outer fiber cladding 6, undergoes a change of angle at the scattering centers 7 there, and is coupled out from the optical fiber 1 into the absorber 9. The radiation-guiding characteristics of the fiber core 2 along the capillary-free longitudinal section 8 remain largely unaffected.

Figure 3:
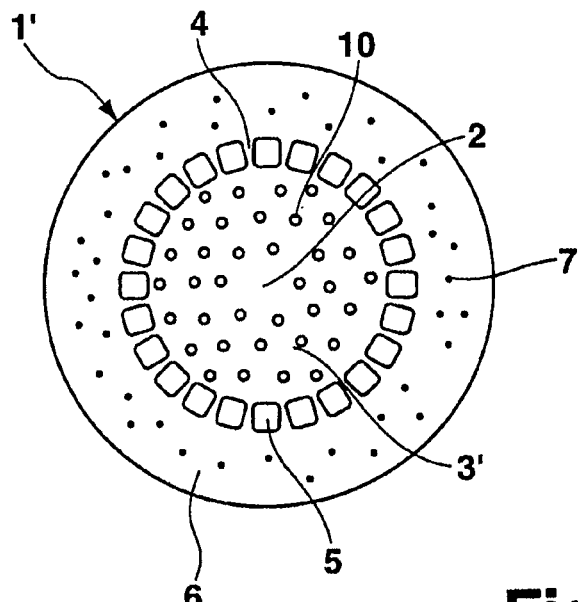

The fiber 1' shown in FIG. 3 differs from the optical fiber 1 only in that here the inner fiber cladding 3' has a microstructure in the form of longitudinally aligned air-filled capillaries 10 and consequently a refractive index lower than that of the fiber core 2. The capillaries 10 extend parallel to the inner fiber cladding 3'. The capillaries 10 can have a diameter in the region of 1 μm and a mutual spacing that exceeds the diameter by around an order of magnitude, such that a numerical aperture of 0.05 to 0.2 results for the fiber core. Laser radiation with a beam quality of 0.2 mm mrad to 20 mm mrad can therefore be transmitted in the optical fiber. To increase the stability of the fiber 1', a further unstructured quartz layer (not shown) can be arranged between the inner fiber cladding 3' and the first outer fiber cladding 4.

Figure 4:
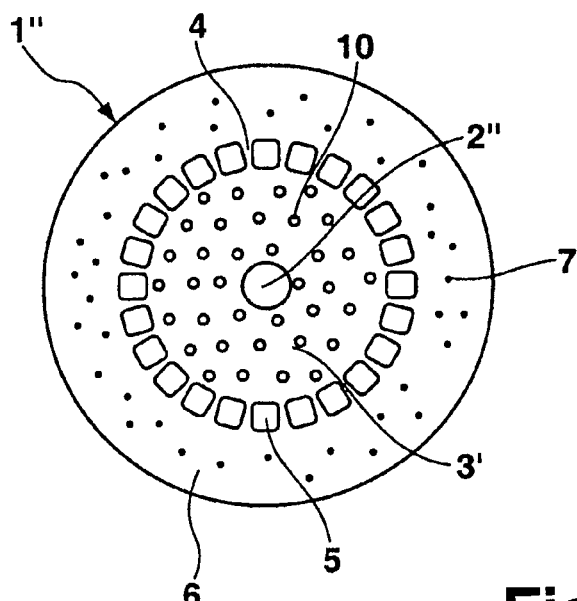

The fiber 1" shown in FIG. 4 differs from the optical fiber 1' in that here the fiber core 2" is formed by the cavity of an air-filled hollow fiber.

OTHER EMBODIMENTS

A number of embodiments of the invention have been described. Nevertheless, it will be understood that various modifications may be made. Accordingly, other embodiments are within the scope of the following claims.

What is claimed:

1. An optical fiber for the transmission of high-power laser radiation, comprising:
    a fiber core;
    an inner fiber cladding surrounding the fiber core and being configured to carry the laser radiation in the fiber core;
    a first outer fiber cladding surrounding the inner fiber cladding, the first outer fiber cladding comprising a first section having longitudinally aligned gas-filled capillaries to provide the first outer fiber cladding with a smaller refractive index than the inner fiber cladding and a longitudinal second section that is free of capillaries;
    a second outer fiber cladding surrounding the first outer fiber cladding; and
    scattering centers provided at least in a region of the second outer fiber cladding that circumferentially surrounds the capillary-free longitudinal section of the first outer fiber cladding, wherein the scattering centers scatter laser radiation emerging from the inner fiber cladding through the first outer fiber cladding along the capillary-free longitudinal section.

2. The optical fiber of claim 1, wherein the fiber core includes doped or undoped quartz glass.

3. The optical fiber of claim 1, wherein the fiber core is formed by the inner cavity of a hollow fiber.

4. The optical fiber of claim 1, wherein the inner fiber cladding includes doped quartz glass, the doping of which is chosen in such a way that the inner fiber cladding has a lower refractive index than a refractive index of the fiber core.

5. The optical fiber of claim 1, wherein the first outer fiber cladding includes quartz glass.

6. The optical fiber of claim 1, wherein the second outer fiber cladding includes quartz glass.

7. The optical fiber of claim 1, wherein the second outer fiber cladding includes scattering centers over its entire length.

8. The optical fiber of claim 1, wherein the scattering centers in the second outer fiber cladding are arranged only in a region of the second outer fiber cladding far from a boundary surface of the second outer fiber cladding that is adjacent to the first outer fiber cladding.

9. The optical fiber of claim 1, wherein the second outer fiber cladding is surrounded along the capillary-free longitudinal section by an absorber.

10. The optical fiber of claim 1, wherein the fiber core has a constant diameter over an entire length of the optical fiber.

11. A method for transmitting high-power laser radiation through an optical fiber that includes a fiber core, an inner fiber cladding surrounding the fiber core, a first outer fiber cladding comprising a first section having longitudinally aligned gas-filled capillaries and a longitudinal second section free of capillaries, the first outer fiber cladding surrounding the inner fiber cladding, a second outer fiber cladding surrounding the first outer fiber cladding, the method comprising:
    passing laser radiation that is within the inner fiber cladding from the inner fiber cladding into the second outer fiber cladding through the capillary-free longitudinal section of the first outer fiber cladding; and
    scattering the laser radiation passed into the second outer fiber cladding at scattering centers within at least a region of the second fiber cladding, wherein the scattered laser radiation scatters out of the optical fiber.

12. The method of claim 11, further comprising placing the optical fiber inside a laser resonator or amplifier to selectively couple out higher laser modes at the capillary-free longitudinal section.

13. The method of claim 11, further comprising capturing the laser radiation scattered out of the optical fiber in an absorber that surrounds the optical fiber at least at the capillary-free longitudinal section.

14. An optical fiber for the transmission of high-power laser radiation, comprising:
- a fiber core;
- an inner fiber cladding surrounding the fiber core and being configured to carry the laser radiation in the fiber core;
- a first outer fiber cladding surrounding the inner fiber cladding, wherein the first outer fiber cladding comprises a first section having longitudinally aligned gas-filled capillaries to provide the first outer fiber cladding with a smaller refractive index than the inner fiber cladding and a longitudinal second section that is free of capillaries;
- a second outer fiber cladding surrounding the first outer fiber cladding and including scattering centers at least in a region near the capillary-free longitudinal section of the first outer fiber cladding, wherein the scattering centers scatter laser radiation emerging from the inner fiber cladding through the first outer fiber cladding along the capillary-free longitudinal section.

15. A method for producing an optical fiber that includes a fiber core, an inner fiber cladding surrounding the fiber core, a first outer fiber cladding comprising a first section having longitudinally aligned gas-filled capillaries, the first outer fiber cladding surrounding the inner fiber cladding, a second outer fiber cladding surrounding the first outer fiber cladding, wherein the first outer fiber cladding has a smaller refractive index than the refractive index of the inner fiber cladding, and the second outer fiber cladding has scattering centers at least along a longitudinal second section of the optical fiber, the method comprising:
- heating the optical fiber at the longitudinal section to thereby remove the longitudinally-aligned gas-filled capillaries present in the first outer fiber cladding along the longitudinal second section.

16. The method of claim 15, wherein the scattering centers in the longitudinal section circumferentially surround the capillary-free longitudinal second section of the first outer fiber cladding.

* * * * *

UNITED STATES PATENT AND TRADEMARK OFFICE
CERTIFICATE OF CORRECTION

PATENT NO. : 8,724,863 B2
APPLICATION NO. : 13/035412
DATED : May 13, 2014
INVENTOR(S) : Malte Kumkar and Rudolf Huber It is certified that error appears in the above-identified patent and that said Letters Patent is hereby corrected as shown below:

On the Title page, column 1, item (63), under Related U.S. Application Data, delete "PCT/CT2006/009439" and insert --PCT/EP2006/009439--.

Signed and Sealed this
Twenty-eighth Day of October, 2014

Michelle K. Lee
*Deputy Director of the United States Patent and Trademark Office*